C. B. HARBAUGH.
MILKING MACHINE.
APPLICATION FILED DEC. 8, 1920.

1,408,505.

Patented Mar. 7, 1922.

WITNESSES
H. D. Chase
C. L. Haal

INVENTOR
Charles B. Harbaugh
By R. S. Caldwell
ATTORNEY

UNITED STATES PATENT OFFICE.

CHARLES B. HARBAUGH, OF MILWAUKEE, WISCONSIN.

MILKING MACHINE.

1,408,505. Specification of Letters Patent. Patented Mar. 7, 1922.

Application filed December 8, 1920. Serial No. 429,085.

*To all whom it may concern:*

Be it known that I, CHARLES B. HARBAUGH, a citizen of the United States, and resident of Milwaukee, in the county of Milwaukee and State of Wisconsin, have invented new and useful Improvements in Milking Machines, of which the following is a description, reference being had to the accompanying drawings, which are a part of this specification.

The invention relates to milking machines.

The important requisites of a milking machine are fewness of moving parts, simplicity of operation, ease in assembling and disassembling of the device for maintaining the device in a clean and sanitary condition, and the ease with which the parts may be cleaned. With these requirements in view I have designed a milking machine having but two parts, a fixed member removably secured to the cover of a pail and a movable member cooperating with said fixed member to form a milk-receiving chamber and valve, the parts having smooth accessible surfaces so that they may be readily cleaned, the release of the device from the cover permitting ready separation of said members.

The invention further consists in the several features hereinafter set forth and more particularly defined by claims at the conclusion hereof.

Figure 1:
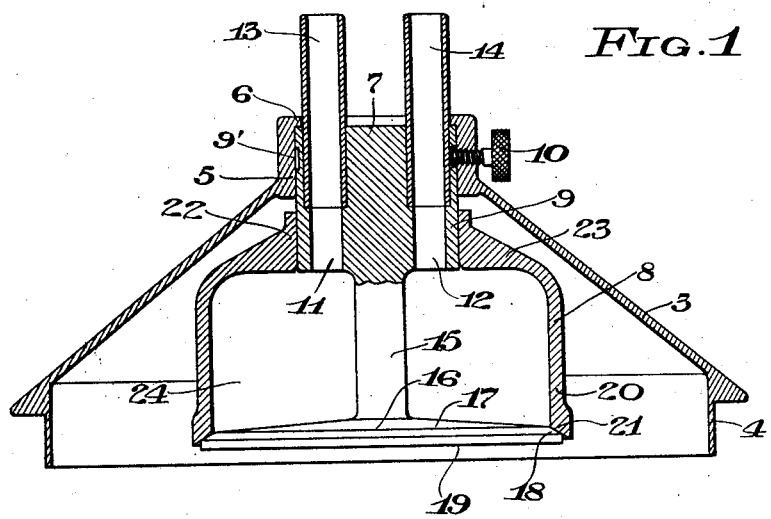
Figure 2:
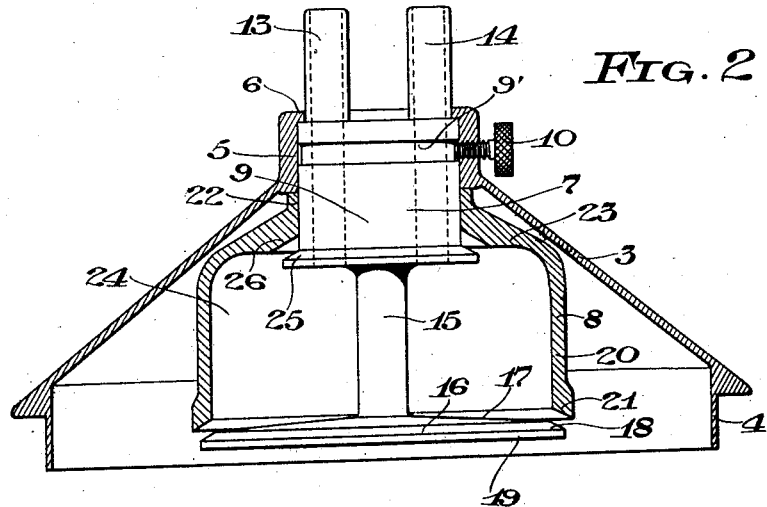

In the drawings: Fig. 1 is a vertical sectional view of a device embodying the invention; Fig. 2 is a similar view showing a modification of the valve.

In the drawings the numeral 3 designates a support, here shown in the form of a cover having a flanged edge to fit over a milk pail or can and provided with a conical top having a centrally disposed opening 5 with an inwardly projecting stop flange 6 at the upper end of said opening. It will be noted that the cover is of simple form with smooth surfaces that are readily accessible for cleaning.

The milking machine, or what is commonly termed the "valve" consists of a fixed member 7 and a movable member 8.

The fixed member 7 comprises a cylindrical head 9 closely fitting the bore 5 and abutting against the flange 6 at the upper end of said bore, said head having an annular groove 9′ in which a thumb screw 10, mounted in the cover, seats to clamp the "valve" to the cover. The head 9 also has passages 11 and 12 therein provided with pipe connections 13 and 14, one passage forming a milk conduit connected to the teat cups in the usual manner and the other, an exhaust conduit, connected to the usual pump or equivalent device for alternately inducing a vacuum in and creating pressure in the milk-receiving chamber. The member 7 has a circular valve stem 15 of reduced diameter from that of said head 9 and depending therefrom and carrying a valve head 16 of greater diameter than the head 9 having a conical upper face 17, a bevelled seating edge 18 and a flat bottom face 19.

The movable member 8 is in the form of a two-diameter sleeve or cup, the part 20 being of larger diameter and provided with a bevelled edge 21 cooperating with the edge 18 to form a valve-controlled opening and the upper end 22 being of smaller diameter and connected with the portion of larger diameter by an inwardly extending flange 23. The upper end 22 of the sleeve slides on the head 9. The member 8 with the member 7 forms a milk-receiving chamber 24.

This chamber 24 in both forms is closed at its lower end when the end 20 seats on the valve head 16 and the weight of the member 8 normally acts to keep the parts in closed position. In Fig. 1 a sliding fit between the head 9 and end 22 suitably seals the upper end of the chamber. In Fig. 2 the lower end of the head 9 is provided with a bevelled flange 25 cooperating with a bevelled seat 26 at the end 22 of the sleeve to seal the upper end of the chamber simultaneously with the sealing of the lower end in addition to the sliding fit between the head 9 and the end 22.

When, during the suction stroke of the pump, the pressure in the chamber 24 drops below atmosphere and a partial vacuum is created therein, the milk from the cow is caused to flow into this closed chamber and on the return stroke of the pump pressure is created in said chamber causing a lifting of the member 8 and the milk then flows out through the opening between the members 7 and 8, as shown in Fig. 2, and into the pail or other receptacle upon which the device is mounted.

The removal of the "valve" from the cover or support 3 permits the operator to readily slip the member 8 off of the member 7 and each of these parts may be easily and thoroughly cleaned because of the absence of any pockets and inaccessible surfaces.

What I claim as my invention is:

1. In a milking machine, the combination with a support, of a member carried thereby and having one end of greater area than the other, a sleeve slidably mounted on the end of said member of smaller area and having sealing contact with the end of larger area, said member and sleeve forming a milk-receiving chamber, an exhaust conduit leading from said chamber, and a milk conduit leading to said chamber.

2. In a milking machine, the combination, of a support having a bore therein, a member having its upper end mounted in said bore and detachably secured thereto, the upper end of said member being of smaller diameter than its lower end, a sleeve slidably mounted on the upper end of said member and having sealing contact with the end of larger diameter, said member and sleeve forming a milk-receiving chamber, an exhaust conduit leading from said chamber, and a milk conduit leading to said chamber.

3. In a milking machine, the combination of a support having a bore therein, a member having its upper end mounted in said bore and having a depending valve head of greater diameter than said upper end, and a sliding sleeve having its upper end slidably mounted on the upper end of said member and its lower end seated on the edge of the valve head, said member and sleeve forming a milk-receiving chamber, the upper end of said member being provided with a milk conduit and an exhaust conduit communicating with said chamber, said sleeve being removable from said member from its upper end when said member is disconnected from said support.

4. In a milking machine, the combination of a support having a bore therein, a member having its upper end mounted in said bore and a lower end of greater diameter than said upper end, and a sliding sleeve having its upper end slidably mounted on the upper end of said member and adapted to seat on both the upper and lower ends of said member, said member and sleeve forming a milk-receiving chamber; said member being provided with a milk conduit and an exhaust conduit communicating with said chamber.

5. In a milking machine, the combination of a support having a bore therein with a stop shoulder adjacent said bore, a member having its upper end mounted in said bore and abutting said shoulder, means for clamping said member to said support, said member having an upper portion of smaller diameter than its lower portion, and a sliding sleeve having its upper end slidable upon the upper portion of said member and having its lower edge adapted to seat on the lower portion of said member, said sleeve and member forming a milk-receiving chamber, said member being provided with a milk conduit and an exhaust conduit communicating with said chamber.

6. In a milking machine, the combination of a support having a bore therein with a stop shoulder adjacent said bore, a member having a cylindrical end mounted in said bore and abutting said shoulder and provided with an annular groove, a clamping screw on said support engaging said groove, said member having a valve head depending from said cylindrical end and of greater diameter than it, and a sliding sleeve having its upper end slidable upon said cylindrical end and its lower end seated on said valve head, said member and sleeve forming a milk-receiving chamber, said member having a milk conduit and an exhaust conduit communicating with said chamber.

7. In a milking machine, the combination with a support, of a member carried thereby and having one end of greater area than the other, a movable member having sealing contact with the portions of different diameters of the first named member during suction, said members forming a milk-receiving chamber, an exhaust conduit leading from said chamber, and a milk conduit leading to said chamber.

In testimony whereof, I affix my signature.

CHARLES B. HARBAUGH.